(12) United States Patent
Wariishi (10) Patent No.: US 6,841,299 B2
(45) Date of Patent: Jan. 11, 2005

(54) ELECTROLYTE COMPOSITION WITH A MOLTEN SALT AND CROSSLINKED POLYMER

(75) Inventor: Koji Wariishi, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 22 days.

(21) Appl. No.: 10/024,187

(22) Filed: Dec. 21, 2001

(65) Prior Publication Data
US 2003/0013021 A1 Jan. 16, 2003

(30) Foreign Application Priority Data
Dec. 22, 2000 (JP) ........................................ 2000-390909

(51) Int. Cl.[7] .............................................. H01M 6/22
(52) U.S. Cl. ....................... 429/188; 429/303; 429/310; 429/311; 429/315; 252/62.2
(58) Field of Search ................................ 429/188, 307; 252/62.2

(56) References Cited
U.S. PATENT DOCUMENTS 4,643,958 A * 2/1987 Thrash ........................ 429/105
5,609,974 A * 3/1997 Sun ............................. 429/192
6,190,805 B1 * 2/2001 Takeuchi ..................... 429/307
6,214,488 B1 * 4/2001 Helmer-Metzmann
6,376,765 B1 * 4/2002 Wariishi
2002/0110739 A1 * 8/2002 McEwen ..................... 429/324

FOREIGN PATENT DOCUMENTS

JP     11307121     * 11/1999    ......... C07D/233/54

* cited by examiner

Primary Examiner—Mark Ruthkosky
(74) Attorney, Agent, or Firm—Sughrue Mion, PLLC (57) ABSTRACT

An electrolyte composition excellent in charge-transporting property that can be prepared with ease, and a non-aqueous electrolyte secondary cell that comprises the electrolyte composition to exhibit excellent cell characteristics while preventing leakage or depletion of the electrolyte composition. The electrolyte composition comprises: a particular molten salt; a polymer prepared by a reaction between an electrophile having at least two unsaturated bonds polarized by an electron-withdrawing group and a nucleophile having a plurality of nucleophilic groups; and a metal salt containing a Group IA metal ion or a Group IIA metal ion.

7 Claims, 1 Drawing Sheet

Fig. 1

ELECTROLYTE COMPOSITION WITH A MOLTEN SALT AND CROSSLINKED POLYMER

FIELD OF THE INVENTION

The present invention relates to an electrolyte composition useful for an anti-static agent, an electrochemical device, etc. and a non-aqueous electrolyte secondary cell comprising the electrolyte composition.

BACKGROUND OF TH INVENTION

Conventionally, a liquid electrolyte composition comprising a solvent and an electrolyte salt dissolved therein has been used for electrochemical devices such as a cell, a capacitor, a sensor, a display device, a recording device, etc. However, the electrochemical devices using such a liquid electrolyte composition are unreliable because they often cause leakage or depletion of the liquid electrolyte composition during long-term operation or storage.

Recently, researches have been actively in progress for solidifying the liquid electrolyte composition to prevent the leakage and depletion and to improve the reliability of the electrochemical device. For example, methods where the liquid electrolyte composition is infiltrated into a polymer matrix to prepare a so-called gel electrolyte composition has been disclosed in R. Koksbang et al., Solid State Ionics, 69, 320 (1994), etc. Although this method can solidify the liquid electrolyte composition without reduction of the charge-transporting property of the electrolyte salt, volatilization of the solvent cannot be completely prevented. Further, a so-called, Polymer-in-salt-type solid electrolyte composition, which is prepared by radical-polymerizing a monomer such as a (meth)acrylate monomer in a room temperature molten salt having a low volatility, has been proposed. However, a secondary cell using the Polymer-in-salt-type solid electrolyte composition is insufficient in the cell characteristics, and fisher, preparation of this electrolyte composition requires a polymerization initiator, a radical-generating apparatus such as a light source, etc. to be complicated in operation.

OBJECT AND SUMMARY OF THE INVENTION

An object of the present invention is to provide an electrolyte composition excellent in a charge-transporting property (ionic conductivity) that can be prepared with ease, and a non-aqueous electrolyte secondary cell that comprises the electrolyte composition to exhibit excellent cell characteristics while preventing leakage or depletion of the electrolyte composition.

As a result of intense research in view of the above object, the inventor has found that an electrolyte composition excellent in charge-transporting property can be easily prepared by conducting a reaction between an electrophile having at least two polarized unsaturated bonds and a nucleophile having a plurality of nucleophilic groups in a molten salt, and that a non-aqueous electrolyte secondary cell using the electrolyte composition exhibits excellent cell characteristics. The present invention has been accomplished by the findings.

Thus, an electrolyte composition of the present invention comprises: a molten salt represented by any of the following general formulae (1), (2) and (3); a polymer prepared by a reaction between an electrophile having at least two unsaturated bonds polarized by an electron-withdrawing group and a nucleophile having a plurality of nucleophilic groups; and a metal salt containing a Group IA metal ion or a Group IIA metal ion.

(1)

(2)

(3)

In the general formulae (1), (2) and (3), $Q_{y1}$ represents an atomic group forming an aromatic cation having a 5- or 6-membered ring structure with the nitrogen atom, $A_{y1}$ represents a nitrogen atom or a phosphorus atom, $R_{y1}$ to $R_{y11}$ independently represent a substituted or unsubstituted alkyl group or a substituted or unsubstituted alkenyl group, $X^-$ represents an anion, two or more of $R_{y2}$ to $R_{y5}$ in the general formula (2) optionally bond together to form a non-aromatic ring containing $A_{y1}$, and two or more of $R_{y6}$ to $R_{y11}$ in the general formula (3) optionally bond together to form a ring.

A non-aqueous electrolyte secondary cell of the present invention comprises the above electrolyte composition of the present invention.

With respect to the electrolyte composition and the non-aqueous electrolyte secondary cell according to the present invention, the charge-transporting property and the cell characteristics are further improved by satisfying any of the following conditions (1) to (5).
(1) The molten salt represented by any of the general formulae (1), (2) and (3) preferably has a melting point of 100° C. or less.
(2) $Q_{y1}$ is preferably composed of atoms selected from the group consisting of carbon, hydrogen, nitrogen, oxygen and sulfur atoms.
(3) The aromatic cation formed by $Q_{y1}$ is particularly preferably an imidazolium cation or a pyridinium cation.
(4) The electron-withdrawing group is preferably selected from the group consisting of a sulfonyl group, a cyano group and a carbonyl group.
(5) The nucleophilic groups are preferably selected from the group consisting of $-NH_2$, $-SH$, $-S^-$, $-SO_2H$ and $-SO_2^-$.

DETAILED DESCRIPTION OF THE PREFERRED EMBODIMENTS

[1]Electrolyte Composition

An electrolyte composition according to the present invention is usable for a solvent for chemical reactions, metal plating, etc., a CCD (charge coupling device) camera, various kinds of photoelectric conversion devices or cells, etc.

The electrolyte composition is particularly preferably used for a non-aqueous electrolyte secondary cell such as a lithium ion secondary cell, etc. The constituents of the electrolyte composition of the present invention will be described in detail below.

(A) Molten Salt

The electrolyte composition of the present invention comprises a molten salt represented by any of the following general formulae (1), (2) and (3). The molten salt is preferably such a salt that is in a liquid state at a room temperature (around 25° C.), a so-called "room temperature-molten salt". A melting point of the molten salt is preferably 100° C. or less, more preferably 80° C. or less, particularly preferably 60° C. or less.

There are many cases where the molten salt represented by any of the general formulae (1), (2) and (3) can be used as the electrolyte with little or no solvent. Even if the molten salt is in a solid state at a room temperature, the molten salt may be liquefied by adding a little amount of solvent or additive thereto, to be used as the electrolyte. Alternatively, the molten salt may be incorporated in the secondary cell without any solvents or additives by: a method where the molten salt is heat-melted and penetrates into an electrode of the secondary cell; a method comprising the steps of dissolving the molten salt in a low boiling solvent such as methanol, acetonitrile and methylene chloride, making the resultant solution penetrate into an electrode, and evaporating the low boiling solvent by heating; etc.

In the general formula (1), $Q_{y1}$ represents an atomic group forming an aromatic cation having a 5- or 6-membered ring structure with the nitrogen atom, and $R_{y1}$ represents a substituted or unsubstituted alkyl group, or a substituted or unsubstituted alkenyl group. $Q_{y1}$ is preferably composed of atoms selected from the group consisting of carbon atoms, hydrogen atoms, nitrogen atoms, oxygen atoms and sulfur atoms. The 5-membered ring formed by $Q_{y1}$ is preferably an oxazole ring, a thiazole ring, an imidazole ring, a pyrazole ring, an iso-oxazole ring, a thiadiazole ring, an oxadiazole ring or a triazole ring, more preferably a thiazole ring, a triazole ring, or an imidazole ring, particularly preferably an imidazole ring. The 6-membered ring formed by $Q_{y1}$ is preferably a pyridine ring, a pyrimidine ring, a pyridazine ring, a pyrazine ring or a triazine ring, particularly preferably a pyridine ring.

In the general formula (2), $A_{y1}$ represents a nitrogen atom or a phosphorus atom, and $R_{y2}$ to $R_{y5}$ independently represent a substituted or unsubstituted alkyl group, or a substituted or unsubstituted alkenyl group. Two or more of $R_{y2}$ to $R_{y5}$ in the general formula (2) may bond together to form a non-aromatic ring containing $A_{y1}$. The non-aromatic ring preferably has a 5- to 8-membered ring structure, more preferably has a 5- or 6-membered ring structure.

In the general formula (3), $R_{y6}$ to $R_{y11}$ independently represent a substituted or unsubstituted alkyl group, or a substituted or unsubstituted alkenyl group. Two or more of $R_{y6}$ to $R_{y11}$ in the general formula (3) may bond together to form a ring, and the ring preferably has a 5- to 8-membered ring structure, more preferably has a 5- or 6-membered ring structure.

With respect to the substituted or unsubstituted alkyl group represented by each of $R_{y1}$ to $R_{y11}$, the alkyl group preferably has 1 to 24 carbon atom and may be straight, branched or cyclic, and examples thereof include a methyl group, an ethyl group, a propyl group, an isopropyl group, a butyl group, a pentyl group, a hexyl group, an octyl group, a 2-ethylhexyl group, a t-octyl group, a decyl group, a dodecyl group, a tetradecyl group, a 2-hexyldecyl group, an octadecyl group, a cyclohexyl group, a cyclopentyl group, etc. With respect to the substituted or unsubstituted alkenyl group represented by each of $R_{y1}$ to $R_{y11}$, the alkenyl group preferably has 2 to 24 carbon atoms and may be straight, branched or cyclic, and examples thereof include a vinyl group, an allyl group, etc. Each of $R_{y1}$ to $R_{y11}$ is preferably an alkyl group having 2 to 12 carbon atoms or an alkenyl group having 2 to 18 carbon atoms, more preferably an alkyl group having 2 to 6 carbon atoms.

$Q_{y1}$ and $R_{y1}$ to $R_{y11}$ in the general formulae (1), (2) and (3) may have a substituent, respectively. Preferred examples of the substituent include: alkyl groups such as a methyl group, an ethyl group, a propyl group, an isopropyl group, a cyclopropyl group, a butyl group, an octyl group, a 2-carboxyethyl group and a benzyl group; alkenyl groups such as a vinyl group, an allyl group and a 1-propenyl group; aryl groups such as a phenyl group, a methoxyphenyl group and a toluyl group; substituted or unsubstituted silyl groups such as a trimethylsilyl group, a t-butyldimethylsilyl group, a phenyldimethylsilyl group and $—(Si(CH_3)_2O)_n—Si(CH_3)_3$; silyloxy groups such as a trimethylsilyloxy group, a t-butyldimethylsilyloxy group and a triethoxysilyloxy group; alkoxy groups such as a methoxy group, an ethoxy group, $—(OCH_2CH_2)_n—OCH_3$ and $—(OCH_2CH_2)_n—OCH_2CH_3$; aryloxy groups such as a phenoxy group and a 4-methoxyphenoxy group; alkoxycarbonyl groups such as a methoxycarbonyl group, an ethoxycarbonyl group and a phenoxycarbonyl group; carbonate groups such as an ethoxycarbonyloxy group and a phenoxycarbonyloxy group; acyl groups such as an acetyl group, a propionyl group and a benzoyl group; sulfonyl groups such as a methane sulfonyl group and a benzene sulfonyl group; acyloxy groups such as an acetoxy group and a benzoyloxy group; sulfonyloxy groups such as a methane sulfonyloxy group and a toluene sulfonyloxy group; phosphonyl groups such as a diethylphosphonyl group; amino groups such as a unsubstituted amino group, a dimethylamino group, a diethylamino group and an anilino group; amido groups such as an acetylamino group and a benzoylamino group; a guanidino group; carbamoyl groups such as an N,N-dimethylcarbamoyl group and an N-phenylcarbamoyl group; a cyano group; alkylthio groups such as a methylthio group and an ethylthio group; heterocyclic groups such as a pyridyl group, an imidazolyl group and a furanyl group; halogen atoms such as a fluorine atom, a chlorine atom, a bromine atom and an iodine atom; etc. Incidentally, the above "n" represents an integer of 1 to 20, respectively.

The molten salt represented by the general formula (1), (2) or (3) may form an oligomer or a polymer through any of $Q_{y1}$ and $R_{y1}$ to $R_{y11}$. The oligomer (or polymer) is preferably a dimer, a trimer or a tetramer, more preferably a dimer.

In the general formulae (1), (2) and (3), $X^-$ represents an anion. Preferred examples of $X^-$ include halide ions such as $I^-$, $Cl^-$ and $Br^-$, $SCN^-$, $BF_4^-$, $PF_6^-$, $ClO_4^-$, $SbF_6^-$, $(CF_3SO_2)_2N^-$, $(CF_3CF_2SO_2)_2N^-$, $Ph_4B^-$, $(C_2H_4O_2)_2B^-$, $(CF_3SO_2)_3C^-$, $CF_3COO^-$, $CF_3SO_3^-$, $C_6F_5SO_3^-$, etc. $X^-$ is particularly preferably $SCN^-$, $BF_4^-$, $PF_6^-$, $ClO_4^-$, $SbF_6^-$, $(CF_3SO_2)_2N^-$, $(CF_3CF_2SO_2)_2N^-$, $(CF_3SO_2)_3C^-$ or $CF_3SO_3^-$.

The molten salt represented by the general formula (1), (2) or (3) may be used in combination with another molten salt. The content of the molten salt is preferably 50 weight % or more, more preferably 70 weight % or more, based on the entire electrolyte composition. Examples of the molten salt used in the present invention will be illustrated below without intention of restricting the scope of the present invention defined by the claims attached hereto.

| | | -continued |
|---|---|---|
| Y9 | [imidazolium with two (CH$_2$CH$_2$O)$_2$CH$_2$CH$_3$ substituents] X$^-$ | Y9-1: X$^-$ = BF$_4^-$<br>Y9-2: X$^-$ = N$^-$(SO$_2$CF$_3$)$_2$<br>Y9-3: X$^-$ = CF$_3$COO$^-$<br>Y9-4: X$^-$ = SCN$^-$<br>Y9-5: X$^-$ = CF$_3$SO$_3^-$ |
| Y10 | [imidazolium with (CH$_2$CH$_2$O)$_2$CH$_3$ on N, -CH$_2$OCH$_2$CH$_2$OCH$_3$ at C2, and (CH$_2$CH$_2$O)$_2$CH$_3$ on other N] X$^-$ | Y10-1: X$^-$ = BF$_4^-$<br>Y10-2: X$^-$ = N$^-$(SO$_2$CF$_3$)$_2$ |
| Y11 | [imidazolium with two (CH$_2$CH$_2$O)$_3$CH$_3$ substituents] X$^-$ | Y11-1: X$^-$ = BF$_4^-$<br>Y11-2: X$^-$ = N$^-$(SO$_2$CF$_3$)$_2$ |
| Y12 | (n)C$_4$H$_9$-[imidazolium]-(CH$_2$)$_6$-[imidazolium]-C$_4$H$_9$(n)   X$^-$ X$^-$ | Y12-1: X$^-$ = BF$_4^-$<br>Y12-2: X$^-$ = N$^-$(SO$_2$CF$_3$)$_2$ |
| Y13 | H$_3$C-[benzimidazolium]-C$_4$H$_9$(n)   X$^-$ | Y13-1: X$^-$ = BF$_4^-$<br>Y13-2: X$^-$ = N$^-$(SO$_2$CF$_3$)$_2$ |
| Y14 | [fused bicyclic imidazolium]-C$_6$H$_{13}$(n)   X$^-$ | Y14-1: X$^-$ = BF$_4^-$<br>Y14-2: X$^-$ = N$^-$(SO$_2$CF$_3$)$_2$ |
| Y15 | H$_3$C-[4-methylpyridinium]-(CH$_2$)$_6$-[4-methylpyridinium]-CH$_3$   X$^-$ X$^-$ | Y15-1: X$^-$ = BF$_4^-$<br>Y15-2: X$^-$ = N$^-$(SO$_2$CF$_3$)$_2$ |
| Y16 | H$_3$C-[pyridinium]-(CH$_2$)$_6$-[pyridinium]-CH$_3$   X$^-$ X$^-$ | Y16-1: X$^-$ = BF$_4^-$<br>Y16-2: X$^-$ = N$^-$(SO$_2$CF$_3$)$_2$ |
| Y17 | H$_3$CH$_2$C—N$^+$(CH$_2$CH$_3$)(CH$_2$CH$_3$)—C$_4$H$_9$(n)   X$^-$ | Y17-1: X$^-$ = BF$_4^-$<br>Y17-2: X$^-$ = N$^-$(SO$_2$CF$_3$)$_2$<br>Y17-3: X$^-$ = PF$_6^-$ |
| Y18 | H$_3$C—N$^+$(CH$_2$CH$_3$)(CH$_2$CH$_3$)—(CH$_2$CH$_2$O)$_2$CH$_3$   X$^-$ | Y18-1: X$^-$ = BF$_4^-$<br>Y18-2: X$^-$ = N$^-$(SO$_2$CF$_3$)$_2$ |

-continued

| | | |
|---|---|---|
| Y19 | H₃C—N⁺(CH₂CH₂O)₂CH₃ / (CH₂CH₂O)₂CH₃ / (CH₂CH₂O)₂CH₃   X⁻ | Y19-1: X⁻ = BF₄⁻<br>Y19-2: X⁻ = N⁻(SO₂CF₃)₂<br>Y19-3: X⁻ = CF₃COO⁻<br>Y19-4: X⁻ = SCN⁻<br>Y19-5: X⁻ = CF₃SO₃⁻ |
| Y20 | H₃CH₂C—N⁺(CH₂CH₃)(CH₂CH₃)—CH₂CH₂O—C₆H₅   X⁻ | Y20-1: X⁻ = BF₄⁻<br>Y20-2: X⁻ = N⁻(SO₂CF₃)₂ |
| Y21 | pyrrolidinium with H₃C, C₄H₉(n)   X⁻ | Y21-1: X⁻ = BF₄⁻<br>Y21-2: X⁻ = N⁻(SO₂CF₃)₂ |
| Y22 | morpholinium with H₃C, C₄H₉(n)   X⁻ | Y22-1: X⁻ = BF₄⁻<br>Y22-2: X⁻ = N⁻(SO₂CF₃)₂ |
| Y23 | H₃C—P⁺(C₄H₉(n))₃   X⁻ | Y23-1: X⁻ = BF₄⁻<br>Y23-2: X⁻ = N⁻(SO₂CF₃)₂ |
| Y24 | crown-ether ammonium, CH₃CH₂(OCH₂CH₂)₂—N⁺—(CH₂CH₂O)₂CH₂CH₃   X⁻ | Y24-1: X⁻ = BF₄⁻<br>Y24-2: X⁻ = N⁻(SO₂CF₃)₂ |
| Y25 | quinuclidinium—(CH₂CH₂O)₂CH₃   X⁻ | Y25-1: X⁻ = BF₄⁻<br>Y25-2: X⁻ = N⁻(SO₂CF₃)₂ |
| Y26 | Me, Et, Me, Me, Me, Me guanidinium   X⁻ | Y26-1: X⁻ = BF₄⁻<br>Y26-2: X⁻ = N⁻(SO₂CF₃)₂<br>Y26-3: X⁻ = PF₆⁻ |
| Y27 | H₃C—pyridine—CH₂CH₂CH₂OCH₂CH₂—imidazolium—CH₃   X⁻ | Y27-1: X⁻ = BF₄⁻<br>Y27-2: X⁻ = N⁻(SO₂CF₃)₂<br>Y27-3: X⁻ = CF₃COO⁻<br>Y27-4: X⁻ = SCN⁻<br>Y27-5: X⁻ = CF₃SO₃⁻ |

-continued

| | | |
|---|---|---|
| Y28 |  | Y28-1: $X^- = BF_4^-$<br>Y28-2: $X^- = N^-(SO_2CF_3)_2$ |
| Y29 |  | Y29-1: $X^- = BF_4^-$<br>Y29-2: $X^- = N^-(SO_2CF_3)_2$ |
| Y30 |  | Y30-1: $X^- = BF_4^-$<br>Y30-2: $X^- = N^-(SO_2CF_3)_2$<br>Y30-3: $X^- = PF_6^-$<br>Y30-4: $X^- = CF_3SO_3^-$<br>Y30-5: $X^- = ClO_4^-$ |

(B) Polymer

The electrolyte composition of this invention comprises a polymer, FE which is prepared by a reaction between an electrophile having at least two a polarized unsaturated bonds and a nucleophile having a plurality of nucleophilic groups. Thus, the polymer used in the present invention is not a conventional polymer prepared by a radical polymerization, but a cross-linked polymer easily prepared by a Michael-type reaction where the nucleophile is added to the polarized unsaturated bond. (i) Electrophile, (ii) Nucleophile and (iii) Preparation of Polymer will be explained in detail below.

(i) Electrophile

The electrophile used in the present invention has at least two unsaturated bonds polarized by an electron-withdrawing group. The number of the unsaturated bonds in a molecule of the electrophile is preferably 2 to 10, more preferably 2 to 6. The unsaturated bonds may be a double bond or a triple bond, respectively.

The electron-withdrawing group may be a sulfonyl group, a cyano group, a carbonyl group, an imino group, a thio-carbonyl group, a sulfinyl group, etc., and is preferably a sulfonyl group, a cyano group or a carbonyl group, more preferably a sulfonyl group or a cyano group. The electrophile may have a plurality of the electron-withdrawing groups, and in this case, the electron-withdrawing groups may be the same or different each other. Examples of the electrophile used in the present invention will be illustrated below without intention of restricting the scope of the present invention defined by the claims attached hereto.

1-1

1-2

1-3

-continued

1-4

1-5

1-6

1-7

2-8

2-9

2-10

2-11

2-12

2-13

2-14

(ii) Nucleophile

The nucleophile used in this invention has a plurality of nucleophilic groups. The number of the nucleophilic groups in a molecule of the nucleophile is preferably 2 to 10, more preferably 2 to 6. The sum total of the number of the nucleophilic groups in the nucleophile and the number of the unsaturated bonds in the electrophile is preferably 5 to 12, more preferably 5 to 10.

The nucleophilic group is not particularly limited if only it has a lone pair or a negative charge and can attack the electrophile to bond thereto providing two bonding electrons. Examples of the nucleophilic group include —NH$_2$, —SH, —S$^-$, —SO$_2$H, —SO$_2^-$, —OH, —COOH, etc. Among them, preferred are —NH$_2$, —SH, —S$^-$, —SO$_2$H and —SO$_2^-$, particularly preferred is —NH$_2$. Incidentally, —S$^-$, —SO$_2^-$, etc. may have an appropriate counter ion. Examples of the nucleophile used in the present invention will be illustrated below without intention of restricting the scope of the present invention defined by the claims attached hereto.

3-1

3-2

3-3

3-4

3-5

3-6

3-7

3-8

3-9

(iii) Preparation of Polymer

The polymer may be prepared by adding the electrophile and the nucleophile to the molten salt of the general formula (1), (2) or (3), thereby carrying out the reaction between the electrophile and the nucleophile under a mild condition. To the reaction mixture may be added a solvent, an additive such as a catalyst, etc. A reaction temperature and a reaction period are not particularly limited. The reaction temperature is preferably 0 to 150° C., more preferably 10 to 100° C. The reaction period is preferably 5 minutes to 2 days, more preferably 10 minutes to 1 day.

Amounts of the electrophile and the nucleophile are preferably controlled such that a ratio nu/m, which means a ratio of the total number nu of the nucleophilic groups in all nucleophile molecules to the total number m of the unsaturated bonds in all electrophile molecules, is 0.2 to 5 in the reaction mixture. The ratio nu/m is more preferably 0.3 to 2, particularly preferably 0.3 to 1.

A weight ratio of the total of the electrophile and the nucleophile is preferably 0.1 to 80 weight %, more preferably 0.5 to 50 weight %, particularly preferably 1 to 30 weight % based on 100 weight % of the molten salt represented by the general formula (1), (2) or (3).

(C) Metal Salt

The electrolyte composition of the present invention comprises a metal salt containing a Group IA metal ion or a Group IIA metal ion. The metal salt is preferably a lithium salt, a sodium salt or a potassium salt, particularly preferably a lithium salt. Examples of the metal salt include $LiCF_3SO_3$, $LiPF_6$, $LiClO_4$, $LiI$, $LiBF_4$, $LiCF_3CO_2$, $LiSCN$, $LiN(SO_2CF_3)_2$, $NaI$, $NaCF_3SO_3$, $NaClO_4$, $NaBF_4$, $NaAsF_6$, $KCF_3SO_3$, $KSCN$, $KPF_6$, $KClO_4$, $KAsF_6$, etc. The metal salt may be used singly or in combination with the other metal salt.

A mole ratio of the metal salt is preferably 0.1 to 8 mole equivalent, more preferably 0.3 to 3 mole equivalent, per 1 mole equivalent of the molten salt represented by the general formula (1), (2) or (3).

(D) Solvent

The electrolyte composition may comprise a solvent. A weight of the solvent is preferably equal to or less than a weight of the molten salt represented by the general formula (1), (2) or (3) in the electrolyte composition. A solvent contents is preferably 50 weight % or less, more preferably 30 weight % or less based of the entire electrolyte composition. The electrolyte composition particularly preferably comprises no solvent from the viewpoint of stability during storage.

To improve an ionic conductibility of the electrolyte composition, it is preferred that the solvent is low in a viscosity to increase an ionic mobility of the electrolyte composition, or that the solvent is high in a permittivity to increase an actual carrier concentration of the electrolyte composition. Further, it is preferred that the solvent has a low volatility from the viewpoint of durability. A boiling point of the solvent is preferably 200° C. or higher, more preferably 250° C. or higher, particularly preferably 270° C. or higher under an ordinary pressure of approximately 1 atmosphere.

Examples of the solvent used in the present invention include: carbonate compounds such as ethylene carbonate and propylene carbonate; heterocyclic compounds such as 3-methyl-2-oxazolidinone; ether compounds such as dioxan and diethyl ether; chain ethers such as ethyleneglycol dialkylethers, propyleneglycol dialkylethers, polyethyleneglycol dialkylethers and polypropyleneglycol dialkylethers; alcohols such as methanol, ethanol, ethyleneglycol monoalkylethers, propyleneglycol monoalkylethers, polyethyleneglycol monoalkylethers and polypropyleneglycol monoalkylethers; polyhydric alcohols such as ethylene glycol, propylene glycol, polyethylene glycol, polypropylene glycol and glycerin; nitrile compounds such as acetonitrile, glutarodinitrile, methoxyacetonitrile, propionitrile and benzonitrile; esters such as carboxylates, phosphates and phosphonates; aprotic polar solvents such as dimethylsulfoxide (DMSO) and sulfolane; etc. Among the solvents, particularly preferred are carbonate compounds, heterocyclic compounds, nitrile compounds and esters. These solvents may be used in combination with each other.

[2] Non-Aqueous Electrolyte Secondary Cell

A non-aqueous electrolyte secondary cell of the present invention comprises the electrolyte composition, whereby the non-aqueous electrolyte secondary cell is excellent in cell characteristics and hardly cause leakage or depletion of the electrolyte composition during long-term operation or storage. An internal structure and a production method of the non-aqueous electrolyte secondary cell according to this invention are not particularly limited.

In the non-aqueous electrolyte secondary cell, the electrolyte composition may be used in combination with a positive electrode, a negative electrode, a jacket material, a separator, a control circuit, etc. For example, the non-aqueous electrolyte secondary cell according to an embodiment of the present invention may be a lithium secondary cell comprising: the electrolyte composition of the present invention; a positive electrode composed of a cathode active material that occludes or releases lithium as a main component, and a conductant agent, a collector, etc.; a negative electrode composed of an anode active material that occludes or releases lithium, and a conductant agent, a collector, etc.; and a jacket material.

Purpose, application and use of the non-aqueous electrolyte secondary cell of the present invention are not particularly limited. For example, the non-aqueous electrolyte secondary cell may be installed and used in an electronic equipment such as a notebook-sized personal computer, a pen input-type personal computer, a mobile personal computer, an electronic book player, a portable telephone, a cordless handset, a pager, a handy terminal, a portable facsimile, a portable copying machine, a portable printer, a headphone stereo receiver, a video movie, a liquid crystal television, a handy cleaner, a portable CD player, a mini-disc player, an electric shaver, an electronic transceiver, an electronic notebook, an electronic calculator, a memory card, a portable tape recorder, a radio, a backup power source, etc. The non-aqueous electrolyte secondary cell may be used for a motor, a lighting fixture, a toy, a game machine, a load conditioner, a clock, a strobe, a camera, a medical instrument such as a pacemaker, a hearing aid and a shoulder massager, etc. Further, the non-aqueous electrolyte secondary cell may be used in combination with a solar cell.

dimethacrylate (EGDMA) as monomers, mole ratio of EGDMA to HEMA being 2 mol %. To the resultant mixture was added 2.9 g of $LiN(SO_2CF_3)_2$, and then, a polymerization initiator of benzoyl peroxide was added thereto and mixed. Mole ratio of benzoyl peroxide was 2 mol % based on 100 mol % of the monomers. Thus-obtained reaction mixture was rapidly cast on a teflon plate and polymerization was allowed to proceed thereon at 80° C. for 12 hours, to prepare a film F-16 of a comparative electrolyte composition. Further, a film F-17 of a comparative electrolyte composition was prepared in the same manner as the film F-1 except for using 3.9 g of propylene carbonate (PC) as a solvent instead of the molten salt Y1-2, changing amount of the materials for a polymer and using a metal salt shown in Table 1.

The molten salt, the materials for the polymer and the metal salt used for each of thus-obtained films and amounts thereof were shown in Table 1. Further, an ionic conductivity of each film was also shown in Table 1. The ionic conductivity was obtained by a Cole—Cole plot of impedance measured at 25° C., 100000 to 0.1 Hz.

TABLE 1

| Film | Molten Salt (Amount) | Materials for Polymer (Amount) | Metal Salt (Amount) | Ionic Conductivity S/cm |
|---|---|---|---|---|
| F-1 | Y1-1 (2.2 g) | 1-6 (0.15 g), 3-3 (0.05 g) | $LiBF_4$ (0.9 g) | $6.0 \times 10^{-4}$ |
| F-2 | Y6-1 (2.0 g) | 1-6 (0.14 g), 3-3 (0.05 g) | $LiBF_4$ (0.9 g) | $6.1 \times 10^{-4}$ |
| F-3 | Y6-2 (3.9 g) | 1-6 (0.2 g), 3-3 (0.07 g) | $LiN(SO_2CF_3)_2$ (2.9 g) | $6.3 \times 10^{-4}$ |
| F-4 | Y6-2 (3.9 g) | 1-6 (0.16 g), 3-3 (0.05 g) | $LiPF_6$ (1.5 g) | $6.0 \times 10^{-4}$ |
| F-5 | Y6-2 (3.9 g) | 1-9 (0.2 g), 3-3 (0.07 g) | $LiN(SO_2CF_3)_2$ (2.9 g) | $6.2 \times 10^{-4}$ |
| F-6 | Y6-2 (3.9 g) | 1-12 (0.2 g), 3-4 (0.07 g) | $LiN(SO_2CF_3)_2$ (2.9 g) | $6.1 \times 10^{-4}$ |
| F-7 | Y6-2 (3.9 g) | 2-5 (0.15 g), 3-3 (0.08 g) | $LiN(SO_2CF_3)_2$ (2.9 g) | $6.0 \times 10^{-4}$ |
| F-8 | Y6-2 (3.9 g) | 2-9 (0.15 g), 3-3 (0.08 g) | $LiN(SO_2CF_3)_2$ (2.9 g) | $6.0 \times 10^{-4}$ |
| F-9 | Y6-2 (3.9 g) | 2-11 (0.15 g), 3-4 (0.08 g) | $LiN(SO_2CF_3)_2$ (2.9 g) | $6.1 \times 10^{-4}$ |
| F-10 | Y6-2 (3.9 g) | 2-11 (0.15 g), 3-12 (0.08 g) | $LiN(SO_2CF_3)_2$ (2.9 g) | $6.2 \times 10^{-4}$ |
| F-11 | Y6-2 (3.9 g) | 2-11 (0.15 g), 3-19 (0.08 g) | $LiN(SO_2CF_3)_2$ (2.9 g) | $6.2 \times 10^{-4}$ |
| F-12 | Y6-5 (2.6 g) | 1-6 (0.13 g), 3-3 (0.04 g) | $Li(CF_3SO_3)$ (1.6 g) | $6.2 \times 10^{-4}$ |
| F-13 | Y9-2 (5.8 g) | 1-6 (0.26 g), 3-3 (0.08 g) | $LiN(SO_2CF_3)_2$ (2.9 g) | $6.1 \times 10^{-4}$ |
| F-14 | Y18-2 (4.7 g) | 1-6 (0.23 g), 3-3 (0.08 g) | $LiN(SO_2CF_3)_2$ (2.9 g) | $6.2 \times 10^{-4}$ |
| F-15 | Y26-2 (4.4 g) | 1-6 (0.14 g), 3-3 (0.05 g) | $LiN(SO_2CF_3)_2$ (2.9 g) | $6.2 \times 10^{-4}$ |
| F-16 | Y6-2 (3.9 g) | HEMA (0.2 g), EGDMA | $LiN(SO_2CF_3)_2$ (2.9 g) | $5.4 \times 10^{-4}$ |
| F-17 | — | 1-6 (0.2 g), 3-3 (0.07 g) | $LiN(SO_2CF_3)_2$ (2.9 g) | $1.0 \times 10^{-3}$ |

EXAMPLES

The present invention will be explained in more detail with reference to examples below without intention of restricting the scope of the present invention.

1. Preparation of Electrolyte Composition Film
(a) Films F-1 to F-15

0.9 g of $LiBF_4$ was added to 2.2 g of a molten salt Y1-2 and dissolved therein. To this mixture was added 0.15 g of an electrophile 1-6 at 25° C., and 0.05 g of a nucleophile 3-3 was then added thereto and stirred. Polymerization reaction proceeded in the resulting reaction mixture, so that this was rapidly cast on a teflon plate and the polymerization reaction was allowed to proceed on the teflon plate for 2 hours, to prepare a film F-1 of an electrolyte composition according to the present invention. Further, films F-2 to F-15 each composed of an electrolyte composition according to the present invention were prepared in the same manner as the film F-1 except for using a molten salt, materials for a polymer (an electrophile and a nucleophile) and a metal salt shown in Table 1, respectively. Incidentally, each of the films F-1 to F-15 had a thickness of 50 μm.

(b) Films F-16 and F-17

To 3.9 g of a molten salt Y6-2 was added 0.2 g of 2-hydroxyethylmethacrylate (HEMA) and ethyleneglycol As shown in Table 1, the electrolyte compositions according to the present invention prepared under a mild condition exhibited a high ionic conductivity.

2. Production of Non-Aqueous Electrolyte Secondary Cell
(a) Preparation of Positive Electrode Sheet To 100 parts by weight of acrylonitrile were added 43 parts by weight of $LiCoO_2$ and 2 parts by weight of a squamous graphite as cathode active materials, and further added 2 parts by weight of acetylene black. Then, 3 parts by weight of polyacrylonitrile was added as a binder thereto and mixed to prepare a slurry. Thus-obtained slurry was applied to an aluminum foil having a thickness of 20 μm by means of an extrusion-type applying apparatus and dried. After drying, the resultant was press-formed into a sheet having a thickness of 95 μm, a width of 54 mm and a length of 49 mm by a calendar press and an aluminum lead plate was weld to ends thereof, to prepare a positive electrode sheet CA-1

A positive electrode sheet CA-2 having a thickness of 114 μm, a width of 54 mm and a length of 49 mm was prepared in the same manner as the positive electrode sheet CA-1 except for using $LiMn_2O_4$ instead of $LiCoO_2$. Further, a positive electrode sheet CA-3 having a thickness of 75 μm, a width of 54 mm and a length of 49 mm was prepared in the same manner as the positive electrode sheet CA-1 except for using LiNiO$_2$ instead of LiCoO$_2$.

(b) Preparation of Negative Electrode Sheet

To 100 parts by weight of N-methylpyrrolidone were added 43 parts by weight of SnSiO$_3$ as an anode active material, 2 parts by weight of acetylene black and 2 parts by weight of graphite as conductant agents, and further, 3 parts by weight of polyacrylonitrile was added thereto as a binder and mixed to prepare a slurry for a negative electrode. Then, 100 parts by weight of N-methylpyrrolidone, 45 parts by weight of α-alumina, 7 parts by weight of graphite and 3 parts by weight of polyacrylonitrile were mixed with each other to prepare a slurry for an auxiliary layer. Thus-obtained slurry for a negative electrode was applied to a copper foil having a thickness of 10 μm, and the slurry for an auxiliary layer was further applied thereonto by means of an extrusion-type applying apparatus. After the applied slurries were dried, the resultant was press-formed into a sheet having a thickness of 46 μm, a width of 55 mm and a length of 50 mm by a calendar press and a nickel lead plate was weld to ends thereof. The resulting sheet was subjected to a heat treatment at 230° C. for 1 hour under a dried air having a dew-point of −40° C. or less by means of a far-infrared ray heater, and lithium foils of 4 mm×55 mm in size having a thickness of 35 μm and a purity of 99.8% were stuck on the entire surface of the sheet at a regular interval of 10 mm in a direction perpendicular to the longitudinal direction of the sheet, to prepare a negative electrode sheet AN-1.

A negative electrode sheet AN-2 was prepared in the same manner as the negative electrode sheet AN-1 except for using Sn$_{0.8}$Al$_{0.2}$B$_{0.3}$P$_{0.2}$Si$_{0.5}$O$_{3.6}$ instead of SnSiO$_3$. Further, a negative electrode sheet AN-3 was prepared in the same manner as the negative electrode sheet AN-1 except for using SnAl$_{0.4}$B$_{0.5}$Cs$_{0.1}$P$_{0.5}$O$_{3.65}$ instead of SnSiO$_3$.

To 100 parts by weight of N-methylpyrrolidone were added 43 parts by weight of a mesophase pitch carbon material manufactured by Petoca Materials Ltd. as an anode active material, 2 parts by weight of acetylene black and 2 parts by weight of graphite as conductant agents. And further, 3 parts by weight of polyacrylonitrile was added thereto as a binder and mixed to prepare a slurry for a negative electrode. Thus-obtained slurry was applied to a copper foil having a thickness of 10 μm by means of an extrusion-type applying apparatus and dried. After drying, the resultant was press-formed into a sheet having a thickness of 46 μm, a width of 55 mm and a length of 50 mm by a calendar press and a nickel lead plate was weld to ends thereof. The resulting sheet was subjected to a heat treatment at 230° C. for 1 hour under a dried air having a dew-point of −40° C. or less by means of a far-infrared ray heater, to prepare a negative electrode sheet AN-4.

(c) Production of Sheet-Shaped Secondary Cell

Figure 1:
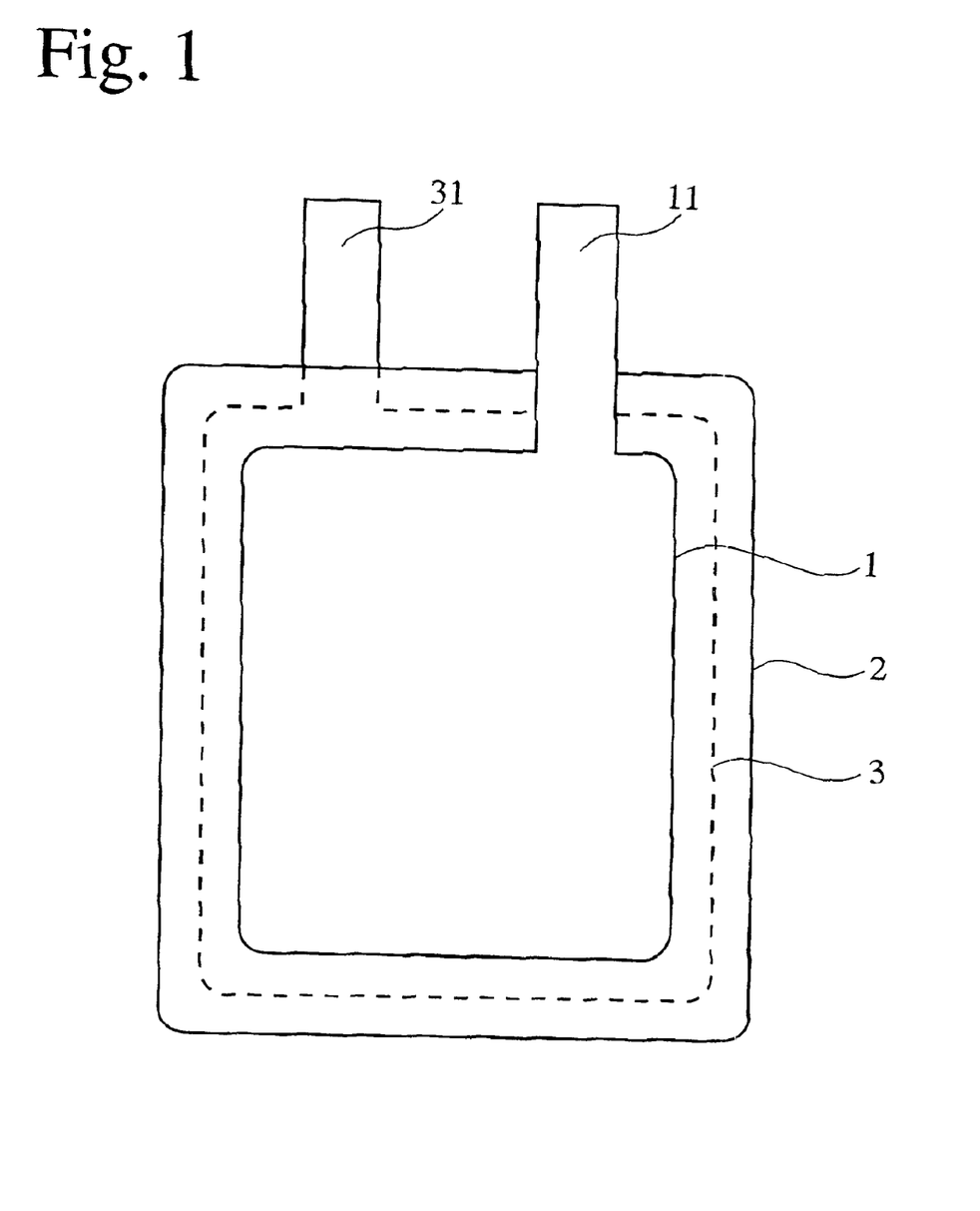
FIG. 1 is a schematic view showing an embodiment of the non-aqueous electrolyte secondary cell according to the present invention.

The positive electrode sheet, the electrolyte composition film and the negative electrode sheet prepared as above were used to produce a sheet-shaped secondary cell shown in FIG. 1. First, the positive electrode sheet 1 (CA-1) having a width of 54 mm and a length of 49 mm combined with a positive electrode terminal 11, and the negative electrode sheet 3 (AN-1) having a width of 55 mm and a length of 50 mm combined with a negative electrode terminal 31 were subjected to dehydration and drying at 230° C. for 30 minutes under a dried air having a dew-point of −40° C. or less, respectively. Next, the positive electrode sheet 1, the electrolyte composition film 2 (F-1) cut into 60 mm×60 mm in size, and the negative electrode sheet 3 were stacked in this order under a dry condition as shown in FIG. 1. Then, a jacket material of a laminate film made of polyethylene (50 μm) and polyethylene terephthalate (50 μm) was heat-welded to the resulting stack under a vacuum condition to seal the stack, whereby a sheet-shaped secondary cell of Example 1 was produced.

Further, sheet-shaped secondary cells of Examples 2 to 11 and Comparative Examples 1 to 7 were produced in the same manner as Example 1 except for using the positive electrode sheet, the electrolyte composition film and the negative electrode sheet shown in Table 2, respectively.

TABLE 2

| Secondary Cell | Positive Electrode Sheet | Negative Electrode Sheet | Electrolyte Composition Film |
|---|---|---|---|
| Ex. 1 | CA-1 | AN-1 | F-1 |
| Ex. 2 | CA-1 | AN-1 | F-3 |
| Ex. 3 | CA-1 | AN-1 | F-7 |
| Ex. 4 | CA-1 | AN-1 | F-8 |
| Ex. 5 | CA-1 | AN-1 | F-10 |
| Ex. 6 | CA-1 | AN-1 | F-11 |
| Ex. 7 | CA-1 | AN-2 | F-3 |
| Ex. 8 | CA-1 | AN-3 | F-3 |
| Ex. 9 | CA-1 | AN-4 | F-3 |
| Ex. 10 | CA-2 | AN-1 | F-3 |
| Ex. 11 | CA-3 | AN-1 | F-3 |
| Comp. Ex. 1 | CA-1 | AN-1 | F-16 |
| Comp. Ex. 2 | CA-1 | AN-2 | F-16 |
| Comp. Ex. 3 | CA-1 | AN-3 | F-16 |
| Comp. Ex. 4 | CA-1 | AN-4 | F-16 |
| Comp. Ex. 5 | CA-2 | AN-1 | F-16 |
| Comp. Ex. 6 | CA-3 | AN-1 | F-16 |
| Comp. Ex. 7 | CA-1 | AN-1 | F-17 |

3. Evaluation (a) Evaluation of Cell Characteristics 10 sheet-shaped secondary cells of Example 1 were produced as above, each of the secondary cells was charged and discharged repeatedly 10 times under a condition of 0.2 C, a charge final voltage of 4.2 V and a discharge final voltage of 2.6 V. Thus, each of the 10 sheet-shaped secondary cells was measured with respect to a discharge capacitance at 10th cycle of the charge and discharge, whereby an average of the discharge capacitances was obtained as "capacitance" of the sheet-shaped secondary cell of Example 1. Capacitances of the sheet-shaped secondary cells of Examples 2 to 11 and Comparative Examples 1 to 7 were obtained in the same manner as the secondary cell of Example 1, respectively.

Then, the capacitances of the secondary cells of Examples 2 to 6 and Comparative Examples 1 and 7 were each divided by the capacitance of the secondary cell of Example 1 that uses the positive electrode sheet and the 1 negative electrode sheet same as those used in Examples 2 to 6 and Comparative Examples 1 and 7, to provide "relative capacitance" of each secondary cell of Examples 2 to 6 and Comparative Examples 1 and 7. Equally, the capacitance X of the secondary cell of Comparative Example 2 was divided by the capacitance of the secondary cell of Example 7, the capacitance of the secondary cell of Comparative Example 3 was divided by the capacitance of the secondary cell of Example 8, the capacitance of the secondary cell of Comparative Example 4 was divided by the capacitance of the secondary cell of Example 9, the capacitance of the secondary cell of Comparative Example 5 was divided by the capacitance of the secondary cell of Example 10, and the capacitance of the secondary cell of Comparative Example 6 was divided by the capacitance of the secondary cell of Example 11, to provide relative capacitances of the secondary cells of Comparative Examples 2 to 6, respectively.

Further, the secondary cells of Examples 1 to 11 and Comparative Examples 1 to 7 were charged and discharged repeatedly 300 times under a condition of 0.5 C, a charge final voltage of 4.2 V and a discharge final voltage of 2.6 V, respectively. Thus, each secondary cell was measured with respect to "cycle capacitance" that means a ratio of discharge capacitance at 300th cycle of the charge and discharge based in discharge capacitance at 10th cycle of the charge and discharge. The relative capacitance and the cycle capacitance of each sheet-shaped secondary cell were shown in Table 3.

(b) Evaluation of Leakage

The jacket material was peeled off from one surface of each sheet-shaped secondary cell of Examples 1 to 11 and Comparative Examples 1 to 7, and a pressure of 200 g/cm² was applied thereto, whereby leakage of a liquid in each secondary cell was observed by visual observation. The results were shown in Table 3, where "A" means that the leakage was not observed, "B" means that the leakage was hardly observed, and "C" means that the leakage was observed.

TABLE 3

| Secondary Cell | Relative Capacitance | Cycle Capacitance | Leakage |
|---|---|---|---|
| Ex. 1 | 1.00 | 0.85 | A |
| Ex. 2 | 0.99 | 0.85 | A |
| Ex. 3 | 0.98 | 0.84 | A |
| Ex. 4 | 0.99 | 0.85 | A |
| Ex. 5 | 0.97 | 0.85 | A |
| Ex. 6 | 0.99 | 0.85 | A |
| Ex. 7 | 1.01 | 0.84 | A |
| Ex. 8 | 1.00 | 0.85 | A |
| Ex. 9 | 1.00 | 0.84 | A |
| Ex. 10 | 1.00 | 0.84 | A |
| Ex. 11 | 1.00 | 0.84 | A |
| Comp. Ex. 1 | 0.88 | 0.79 | B |
| Comp. Ex. 2 | 0.87 | 0.78 | B |
| Comp. Ex. 3 | 0.85 | 0.76 | B |
| Comp. Ex. 4 | 0.77 | 0.78 | B |
| Comp. Ex. 5 | 0.85 | 0.73 | B |
| Comp. Ex. 6 | 0.85 | 0.79 | B |
| Comp. Ex. 7 | 1.20 | 0.65 | C |

As shown in Table 3, the sheet-shaped secondary cells of Examples 1 to 11 according to the present invention were excellent in the capacitance and stability in repeated operation, and prevented the leakage of the electrolyte composition.

As described in detail above, the electrolyte composition of the present invention is excellent in the charge-transporting property (ionic conductivity) and can be prepared with ease. The non-aqueous electrolyte secondary cell of the present invention comprising the electrolyte composition exhibits excellent cell characteristics while preventing leakage or depletion of the electrolyte composition.

What is claimed is:

1. An electrolyte composition comprising: a molten salt represented by any of the following general formulae (1), (2) and (3); a cross-linked polymer cross-linked by an atomic group having a substructure —C—C-hetero atom— at two or more positions adjacent to an electron-withdrawing group, said hetero atom being at least one atom selected from the group consisting of S, N, and O prepared by a reaction between an electrophile having at least two unsaturated bonds polarized by said electron-withdrawing group and a nucleophile having a plurality of nucleophilic groups; and a metal salt containing a Group IA metal ion or a Group IIA metal ion wherein, in general formulae (1), (2) and (3), $Q_{y1}$ represents an atomic group forming an aromatic cation having a 5- or 6-membered ring structure with the nitrogen atom, $A_{y1}$ represents a nitrogen atom or a phosphorus atom, $R_{y1}$ to $R_{y11}$ independently represent a substituted or unsubstituted alkyl group or a substituted or unsubstituted alkenyl group, $X^-$ represents an anion, two or more of $R_{y2}$ to $R_{y5}$ in the general formula (2) optionally bond together to form a non-aromatic ring containing $A_{y1}$, and two or more of $R_{y6}$ to $R_{y11}$ in the general formula (3) optionally bond together to form a ring.

2. The electrolyte composition according to claim 1, wherein said $Q_{y1}$ is composed of atoms selected from the group consisting of carbon, hydrogen, nitrogen, oxygen and sulfur atoms.

3. The electrolyte composition according to claim 1, wherein said aromatic cation formed by said Q is an imidazolium cation or a pyridinium cation.

4. The electrolyte composition according to claim 1, wherein said electron-withdrawing group is selected from the group consisting of a sulfonyl group, a cyano group and a carbonyl group.

5. The electrolyte composition according to claim 1, wherein said nucleophilic groups are selected from the group consisting of —NH₂, —SH, —S⁻, —SO₂H and —SO₂⁻.

6. A non-aqueous electrolyte secondary cell comprising the electrolyte composition recited in claim 1.

7. A process for manufacturing an electrolyte composition comprising: a molten salt represented by any of the following general formulae (1), (2) and (3); a polymer prepared by a reaction between an electrophile having at least two unsaturated bonds polarized by an electron-withdrawing group and a nucleophile having a plurality of nucleophilic groups; and a metal salt containing a Group IA metal ion or a Group IIA metal ion wherein, in general formulae (1), (2) and (3), $Q_{y1}$ represents an atomic group forming an aromatic cation having a 5- or 6-membered ring structure with the nitrogen atom, $A_{y1}$ represents a nitrogen atom or a phosphorus atom, $R_{y1}$ to $R_{y11}$ independently represent a substituted or unsubstituted alkyl group or a substituted or unsubstituted alkenyl group, $X^-$ represents an anion, two or more of $R_{y2}$ to $R_{y5}$ in the general formula (2) optionally bond together to form a non-aromatic ring containing $A_{y1}$, and two or more of $R_{y6}$ to $R_{y11}$, in the general formula (3) optionally bond together to form a ring, which process comprises adding an electrophile and a nucleophile to said molten salt, and reacting the electrophile and the nucleophile by Michael-type addition reaction to thereby form a cross-linked polymer, wherein the electrophile has at least two polarized unsaturated bonds polarized by an electron-withdrawing group and the nucleophile has a plurality of nucleophilic groups, wherein the nucleophilic groups are selected from the class consisting of —$NH_2$, —SH, —$S^-$, —$SO_2^-H$, —$SO_2^-$, —OH and —COOH.

* * * * *